United States Patent [19]
Feller

[11] 3,952,512
[45] Apr. 27, 1976

[54] FOOT PEDAL CONTROL MECHANISM FOR HYDROSTATIC TRANSMISSION VEHICLES

[75] Inventor: Murray D. Feller, Richmond, Canada

[73] Assignee: Towmotor Corporation, Mentor, Ohio

[22] Filed: Jan. 30, 1975

[21] Appl. No.: 545,643

[52] U.S. Cl. ............................. 60/431; 60/433; 60/434; 74/478; 74/474
[51] Int. Cl.² ................ F16H 39/46; F15B 15/18
[58] Field of Search ................ 60/431, 433, 434

[56] References Cited
UNITED STATES PATENTS

| | | | |
|---|---|---|---|
| 3,003,309 | 10/1961 | Bowers et al. | 60/431 |
| 3,284,999 | 11/1966 | Lease | 60/431 |
| 3,369,360 | 2/1968 | De Biasi | 60/433 X |
| 3,691,863 | 9/1972 | Shaffer | 74/478 |
| 3,826,097 | 7/1974 | Tone | 60/431 |

Primary Examiner—Edgar W. Geoghegan
Attorney, Agent, or Firm—Phillips, Moore, Weissenberger Lempio & Strabala

[57] ABSTRACT

Coordinated control of engine speed, transmission drive ratio and drive direction is provided for with a single foot pedal and a compact economical linkage arrangement for coupling the pedal to a vehicle engine and hydrostatic transmission. Forward rocking of the pedal from a neutral position progressively increases transmission drive ratio in the forward direction while backward rocking of the pedal from the neutral position progressively increases the drive ratio in the reverse direction. The pedal linkage further produces a unidirectional progressive motion of the engine speed control upon being rocked in either the forward or backward direction and this engine speed control motion may be continued by additional pedal movement after the transmission control member has reached the maximum possible movement in either direction.

8 Claims, 4 Drawing Figures

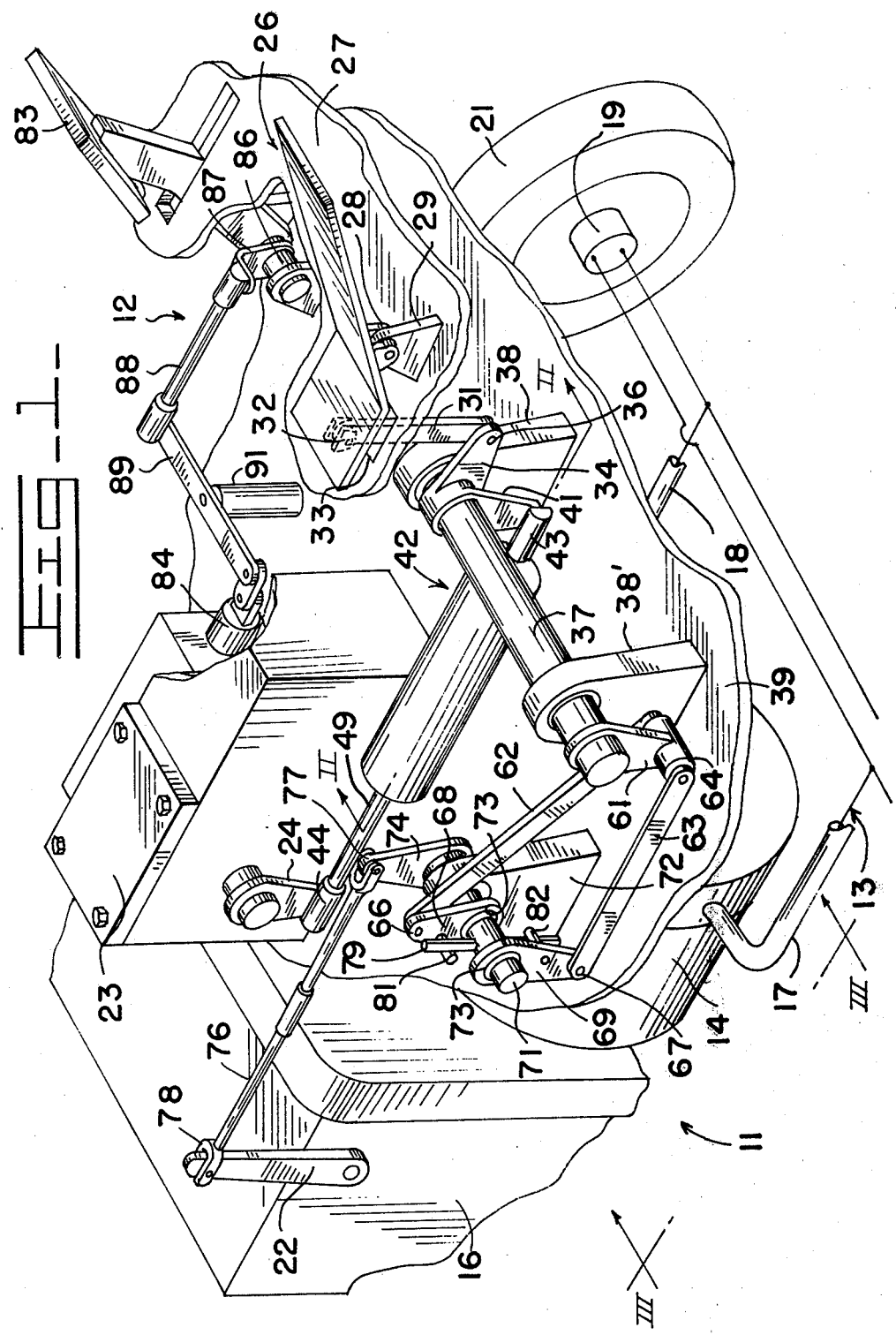

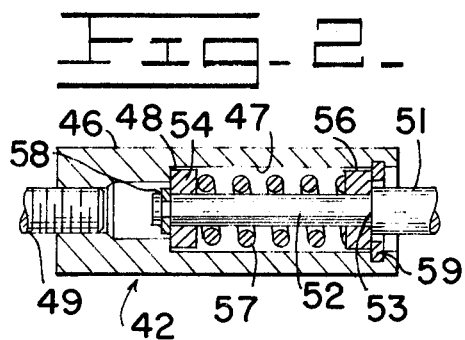
Fig-2-
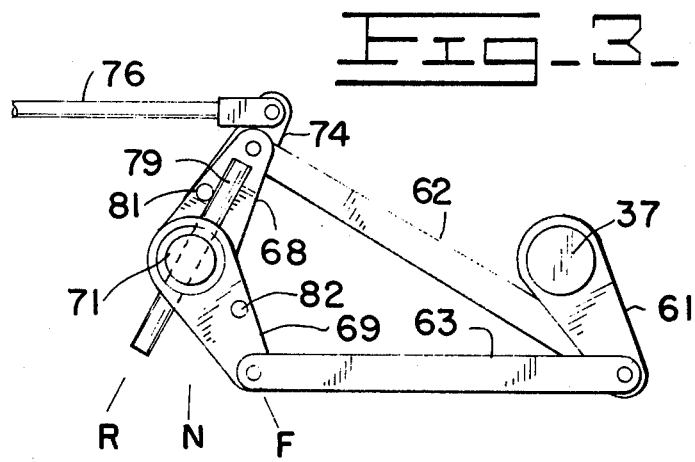
Fig-3-
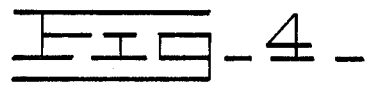
Fig-4-
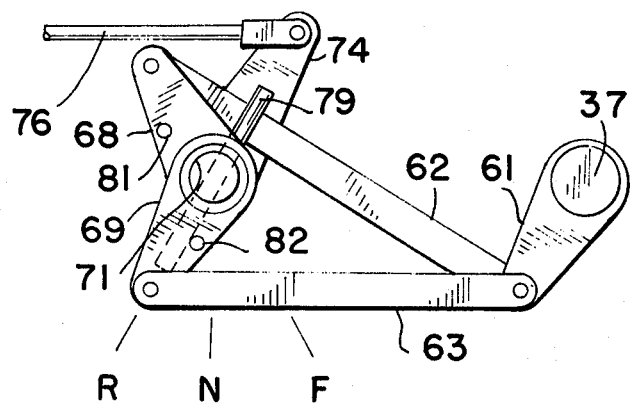

FOOT PEDAL CONTROL MECHANISM FOR HYDROSTATIC TRANSMISSION VEHICLES

BACKGROUND OF THE INVENTION

This invention relates to mechanisms for enabling the operator of a vehicle to adjust engine speed, transmission drive ratio and drive direction with a single control element and more particularly to control of a vehicle having a hydrostatic transmission and in which vehicle speed is varied in part by adjusting drive ratio and in part by adjusting engine speed.

Certain vehicles, of which industrial lift trucks and loaders are typical examples, are often equipped with a hydrostatic transmission which provides for infinite variation of the drive ratio between the engine and drive wheels or the like in both forward and reverse drive directions. The drive ratio and the drive direction are controllable by selectively moving a control member away from a central or neutral position. Motion in one direction progressively increases drive ratio in the forward drive mode while motion of the control member in the opposite direction from the neutral position progressively increases drive ratio in the reverse drive mode. The operator's task is greatly simplified in that shifting of a transmission is unnecessary and vehicle speed, drive ratio and drive direction may all be controlled through movement of a single member.

Under most conditions it is desirable that engine speed be increased as drive ratio increases in either forward or reverse directions and preferably this engine control function should also be accomplished by the same movement of the operator's control member which adjusts the transmission. However, the movement of the engine speed control element away from the idling position that is required for this purpose must be in the same direction regardless of whether the operator's control member is moved forward or backward.

Interconnections between the operator's control member and the transmission and the engine are still further complicated as it is desirable that the operator be able to further increase engine speed after the transmission drive ratio control element has reached its maximum movement in either the forward or reverse direction. This may be desirable, for example, when the vehicle is travelling relatively fast at the maximum available drive ratio and either a further speed increase is desired or the vehicle is subjected to increased loading such as may occur from starting up an inclined slope. It is then necessary to further open the engine throttle, governor rack or the like in order to maintain speed.

Thus, if the operator is to control both the hydrostatic transmission and engine speed with a single control member, the linkage which interconnects these components must be capable of shifting the transmission control element in either direction from a neutral position in accordance with the corresponding movement of the operator's control member and must concurrently shift the engine speed control a proportionate amount but always in the same direction regardless of the direction of movement of the control member. Further, the linkage must enable continued movement of the engine speed control in a single direction after the transmission control has reached the limit of travel in either direction.

Because of these complicated requirements, the linkages heretofore used for interconnecting a single operator's control member with both a hydrostatic transmission and an engine have been undesirably complex and costly or else have been limited with respect to providing maximum flexibility of the several desired control functions.

SUMMARY OF THE INVENTION

This invention provides simplified, compact and economical linkage for coupling an operator's control member, which may be a foot pedal, with a transmission and with an engine to enable control of the speed and drive direction of a vehicle. Forward and backward rocking of the foot pedal or the like produces corresponding movements of the transmission control while moving the engine speed control in a single direction regardless of the direction of foot pedal motion. The linkage further enables continued movement of the engine speed control in a single direction by motion of the foot pedal in either direction after the limits of transmission control member movement have been reached.

Accordingly, it is an object of this invention to provide a simple, compact, reliable and economical control mechanism enabling optimized control of vehicle speed, drive ratio and drive direction by movement of a single operator's control member.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is a perspective view of a portion of a vehicle carrying the control linkage of the present invention thereon and showing portions of certain components of the vehicle which are controlled through the linkage, FIG. 2 is a section view of a linkage component taken along line II—II of FIG. 1, FIG. 3 is a side view of a portion of the linkage of FIG. 1 taken along lines III—III thereof but showing the linkage shifted to the forward drive position whereas the linkage is at the neutral position in FIG. 1, and FIG. 4 is a view of the linkage structure shown in FIG. 3 after the linkage has been shifted from the forward drive to the reverse drive position.

DESCRIPTION OF A PREFERRED EMBODIMENT

Referring now to the drawing and initially to FIG. 1 thereof, a portion of an industrial lift truck vehicle 11 is shown in order to illustrate the coaction of the present invention therewith. The vehicle 11 may be of a conventional construction except for the operator's control linkage 12 which will hereinafter be described in more detail. The vehicle is of the particular type having a hydrostatic transmission 13 driven by an engine or motor 16. The hydrostatic transmission 13 may be of any of the known constructions which typically include a variable displacement fluid pump 14 driven by the vehicle motor 16 and having a pair of fluid outlet conduits 17 and 18 which communicate with rotary fluid motors 19 that turn the drive wheels 21 of which only one drive wheel is depicted in FIG. 1. The vehicle motor 16 has a control element 22 movable to vary engine speed and which may variously be a throttle lever, governor rack or rheostat depending on the form of the motor. The hydrostatic transmission 13 and the associated control valve assembly 23 may be of any of various known forms and has a transmission control element 24 which is movable to vary the displacement of pump 14 and to thereby vary the effective drive ratio through the transmission. The transmission control element 24 is depicted in the neutral position in FIG. 1 at which the displacement of pump 14 is zero and may be pivoted away from such position in one direction, forwardly in this example, to establish forward drive through the transmission 13 at a drive ratio determined by the degree of displacement of the control member 24 from the neutral position. Similarly, pivoting of the transmission control element 24 backwardly in this example from the neutral position establishes reverse drive through the transmission at a ratio which progressively increases in response to continued pivoting of the control element.

Suitable detailed constructions for the vehicle 11, engine 16, hydrostatic transmission 13 and transmission control valve assembly 23 are known to the art and accordingly will not be further described herein, the control linkage 12 of the present invention being adaptable to a variety of such mechanisms.

Control of the vehicle speed and of the drive direction of the vehicle are thus dependent on operator initiated movements of the engine speed control element 22 and transmission control element 24 but the necessary movements of these two elements are not identical. Transmission control element 24 may be selectively moved in either of two opposite directions from the neutral position depending on the drive direction desired while engine speed control element 22 should be moved in a single direction concurrent with the movement of transmission control element 24 in either direction. As previously discussed, control is further complicated in that it is desirable that the engine speed control element 22 be movable for an additional distance after the transmission control element 24 has reached either extreme of movement. Notwithstanding the different movements required for the two control elements 22 and 24, it is preferable from the operator's standpoint that both be actuated in response to movement of a single operator's control member which is preferably a foot operated pedal 26 in many cases. Single foot pedal control of the engine and transmission is highly desirable in industrial lift trucks and certain earthmoving vehicles, for example, as the operator may be required to manipulate a number of other controls for load handling or other purposes.

Considering now the control linkage structure 12 through which the necessary movements of the control elements 22 and 24 are effected, foot pedal 26 preferably has an angled configuration and is supported for forward and backward rocking movement at a position slightly above the deck or floor platform 27 of the operator's compartment of the vehicle. To support pedal 26 in this manner, a pivot coupling 28 at the underside of the angled portion of the pedal couples the pedal to a lug 29 extending upward from the deck and enables the pedal to rock forward or backward to produce vehicle motion in a corresponding direction. A link 31 has an upper end coupled to the underside of the back portion of pedal 26 at another pivot joint 32 and extends downwardly therefrom through a slot 33 in deck 27 to connect with a first bellcrank arm 34 through a lower pivot joint 36. Crank arm 34 extends radially from a first shaft 37 which is itself disposed transversely on the vehicle. Shaft 37 is supported for rotational movement by a pair of spaced apart brackets 38 and 38' secured to subflooring 39. Another bellcrank arm 41 extends radially from shaft 37 at right angles to bellcrank arm 34 and is linked thereto for pivoting motion therewith. A longitudinally resilient link assembly 42 has forward and rearward ends coupled to the ends of bellcrank arm 41 and transmission control element 24 respectively through additional pivot couplings 43 and 44 respectively. Accordingly, forward rocking motion of foot pedal 26 acts through link 31, bell crank arms 34 and 41 and resilient link 42 to pivot the transmission control element 24 forward. Backward rocking of the foot pedal produces a reverse pivoting movement of the transmission control element.

Resilient link assembly 42 enables the above described rocking motion of the foot pedal 26 to be continued after the transmission control element 24 has reached the limit of pivoting motion in either direction as further foot pedal motion then acts to compress or extend the resilient link assembly depending on the direction of the foot pedal motion. For a suitable internal construction for the resilient link assembly 42, reference should be made to the FIG. 2 in conjunction with FIG. 1.

The resilient link assembly 42 may have a cylinder portion 46 having an axial passage 47 therethrough, the passage having a stepped configuration to provide an annular shoulder 48 within the cylinder. A rod 49 is threaded into the smaller diameter end of passage 47 to couple to the transmission control element 24 as previously described while a movable rod 51 is coupled to the bellcrank arm 41 as previously described and extends into the large diameter end of passage 47. Within cylinder 46, rod 51 has a reduced diameter end portion 52 forming an annular shoulder 53 on the rod. A pair of retainer rings 54 and 56 are disposed coaxially on rod portion 52 and a compression spring 57 extends between the two rings also in coaxial relationship with rod portion 52. A first snap ring 58 is seated in a groove in the end of rod portion 52 to retain ring 54 thereon while a second larger snap ring 59 is seated within bore 47 to be abutted by the other retainer ring 56 which also seats against the shoulder 53 of the rod.

Spring 57 exerts sufficient force to cause the link assembly 42 to function essentially as a rigid link, transferring motion of crank arm 41 to transmission control element 24, as long as the element 24 can be pivoted. However, after transmission control element 24 has reached the limit of its motion in either direction, motion of the foot pedal 26 can continue inasmuch as link assembly 42 may compress or extend in the axial direction by compression of spring 57 at either end thereof.

Referring again to FIG. 1 in particular, the above described motion of transmission control element 24 in either direction is accompanied by motion of the engine speed control element 22 in a single direction, the element 22 being moved forward in this particular example. Mechanism for realizing this speed control element movement includes another arm 61 extending radially from shaft 37 and being secured thereto so that it is swung forward when foot pedal 26 is rocked forward and is swung backward when the foot pedal is rocked to the rear. The forward ends of two links 62 and 63 are coupled to the outer end of arm 61 through a single pivot joint 64. The back ends of links 62 and 63 are coupled, through pivot joints 66 and 67, to a pair of levers 68 and 69 respectively which extend radially from a second shaft 71. Shaft 71 is parallel to shaft 37 and is supported above subflooring 39 by a bracket 72. Levers 68 and 69 are both supported on shaft 71 through sleeve bearings 73 which enable the levers to turn relative to the shaft 71 and relative to each other.

An additional arm 74 extends radially from shaft 71 on the opposite side of bracket 72 from levers 68 and 69 and is fixed to the shaft to turn therewith. A speed control rod 76 has a forward end coupled to the outer end of arm 74 through a pivot coupling 77 and has a back end coupled to the engine speed control element 22 through another pivot coupling 78. Accordingly, forward pivoting motion of arm 74 swings the engine speed control element 22 forwardly from the idling position depicted in FIG. 1 to increase engine speed. Considering now the means by which this is accomplished in response to turning of the first shaft 37 in either direction, a rod 79 is transpierced through second shaft 71, between levers 68 and 69, and extends parallel to both such levers when the control linkage 12 is at the neutral position depicted in FIG. 1. A first short pin 81 extends from lever 68 in parallel relationship to shaft 71 and in position to contact the rear side of the upper end of rod 79 when the linkage is in the neutral position depicted in FIG. 1. A second short pin 82 extends from lever 69 in parallel relationship to shaft 71 in position to contact the forward side of the lower end of rod 79 when the control linkage is in the neutral position.

If foot pedal 26 is rocked forward from the neutral position, arm 61 of the first shaft 37 is swung forwardly and if the foot pedal is rocked backwardly from the neutral position, the arm 61 swings to the rear. Through the above described linkage, either motion of arm 61 pivots the engine speed control element 22 forwardly. This action can best be understood by reference to FIG. 3 which shows certain elements of the linkage in the positions reached when arm 61 has been turned to the full forward speed position. At this position, both of the levers 68 and 69 have been swung forwardly on second or rear shaft 71 by links 62 and 63 respectively. Pin 81 acting against rod 79 has turned the second shaft 71 in a clockwise direction as viewed in FIG. 3 thereby causing arm 74 to pull the speed control rod 76 forwardly.

Referring now to FIG. 4, the same motion of the speed control rod 76 occurs if the first shaft 37 and arm 61 turn in the opposite direction to the full speed reverse position. In this case, both levers 68 and 69 have been swung to the rear from the neutral position by links 62 and 63 but rod 79 and shaft 71 have again been rotated in a clockwise direction as viewed in the Figure just as in the previous case. This occurs since the lower pin 82 has now reacted against the lower end of rod 79 to force the clockwise rotation of shaft 71 and lever 74 to again pull the speed control rod 76 forwardly.

Referring again to FIG. 1, the above described control linkage 12 accomplishes the desired coordinated but different movements of the transmission control element 24 and engine speed control element 22 in response to movement of a single foot pedal 26 with a compact simple arrangement of parts which do not involve any excessively costly components or bulky components which would complicate the task of fitting in other necessary control mechanisms. For example, industrial lift trucks and other vehicles of the kind upon which this form of controls may be utilized are often provided with an inching foot pedal 83 which must also be coupled to a spool 84 of the transmission control valve assembly 23 to provide for precise control of vehicle speed at low speeds by enabling throttling of the fluid flow to hydrostatic transmission 13. The inching pedal 83 may be located in close proximity to the primary speed control foot pedal 26 and may be coupled to spool 84 through a simple linkage arrangement including a shaft 86 to which the pedal is secured and which carries a radially extending lever 87 which acts through a rearwardly extendng rod 88 to turn a lever 89 supported on a pivot post 91 and having an opposite end coupled to the spool 84. As will be apparent from FIG. 1, the speed control linkage 12 provides ample space in the immediate region thereof for still additional controls or other vehicle components which might be required.

In most cases the control element 24 of a hydrostatic transmission control valve is biased towards the neutral position by internal spring means and the speed control element 22 of a motor is spring biased to the idle position and these pre-existing spring forces are sufficient to urge the control linkage 12 including foot pedal 26 to the neutral position in the absence of operator pressure thereon. If this biasing force is not present or is insufficient for the purpose, supplementary biasing springs may readily be connected to the linkage or pedal at any suitable point.

While the invention has been described with respect to a single preferred embodiment, it will be apparent that many variations are possible and it is not intended to limit the invention except as defined in the following claims.

What is claimed is:

1. Control mechanism enabling selection of vehicle speed and drive direction in a vehicle having a motor speed control element movable from an idling position to increase motor speed and also having a hydrostatic transmission control element movable in one direction from a neutral position to progressively increase forward drive ratio and movable in an opposite direction from said neutral position to progressively increase reverse drive ratio, said control mechanism comprising:
   an operator's control member supported for forward and backward rocking movement from a neutral position,
   a first shaft supported for rotational motion about the axis thereof and being coupled to said operator's control member to be turned in a first rotational sense upon forward rocking of said control member and to be turned in an opposite rotational sense upon backward rocking of said control member,
   a first arm extending radially from said first shaft for turning therewith,
   a first link means for connecting said first arm and said transmission control element whereby said transmission control element is moved in said one direction in response to forward rocking of said control member and is moved in said opposite direction in response to said backward rocking of said control member,
   a second arm extending radially from said first shaft for turning therewith,
   a secons shaft supported for rotational movement about the axis thereof,
   a third arm extending radially from said second shaft for turning therewith,
   an engine speed control rod connecting said third arm with said engine speed control element whereby engine speed is increased upon rotational movement of said second shaft in a specific direction, first and second spaced apart levers mounted upon said second shaft and extending radially therefrom in substantially opposite directions when said control member is at said neutral position, said first and second levers being turnable relative to said second shaft, second and third link means for connecting said first and second levers respectively to said second arm whereby said first and second levers are turned in opposite rotational directions in response to movement of said second arm, rod means extending radially from opposite sides of said second shaft and being secured thereto for turning motion therewith, means on said first lever for contacting said rod means to turn said rod means and said second shaft in said specific direction when said first shaft is turned in said first rotational sense, and means on said second lever for contacting the other end of said rod means to turn said rod means and said second shaft in said specific direction when said first shaft is turned in said opposite rotational sense.

2. The combination defined in claim 1 wherein said operator's control member is a foot pedal supported for rocking motion about an axis transverse to said vehicle.

3. The combination defined in claim 1 wherein said first and second shafts are parallel, and wherein said first and second arms extend radially from said first shaft in parallel relationship and wherein said first and second levers extend in opposite directions from said second shaft in parallel relationship to said first and second arms when said foot pedal is at said neutral position.

4. The combination defined in claim 3 wherein said operator's control member is a foot pedal and one end of said first shaft is disposed below said foot pedal, and wherein said foot pedal is linked to said first shaft through a bellcrank arm extending radially from said first shaft at right angles to said first arm and through a pivot link connecting said bellcrank arm with the underside of said foot pedal.

5. The combination defined in claim 1 wherein said first link means is a resilient means which is axially extendible and compressible in response to a predetermined longitudinal force exceeding that required to move said transmission control element from said neutral position.

6. The combination defined in claim 5 wherein said first link means comprises a hollow cylinder coupled to one of said first arm and said transmission control element, a rod extending into said cylinder and coupled to the other of said first arm and said transmission control element, and resilient means in said cylinder resisting relative axial movement between said rod and said cylinder with said predetermined force.

7. The combination defined in claim 1 wherein said first and second levers are spaced apart along the axis of said second shaft, and wherein said rod means comprises rod portions extending from said second shaft along opposite radii thereof which opposite radii are parallel to said oppositely directed first and second levers when said foot pedal is at said neutral position and wherein said means on said first lever and said means on said second lever comprise a pair of pins each extending from a separate one of said levers towards the other thereof, said pins being parallel and being on opposite sides of said second shaft and on opposite sides of said rod means.

8. Mechanisms for selectively controlling vehicle speed and drive direction in a vehicle having a motor speed control element movable in a single direction to increase motor speed and having a hydrostatic transmission control element movable in one direction from a neutral position to increase forward drive ratio and movable in an opposite direction from said neutral position to increase reverse drive ratio, comprising:

a foot pedal supported for forward and backward rocking movement from a neutral position, first linkage means for moving said transmission control element in said one direction in response to said forward rocking movement of said foot pedal and for moving said transmission control element in said opposite direction in response to said backward rocking movement of said foot pedal, said first linkage means having a resilient component enabling rocking movement of said foot pedal to be continued after said transmission control element has reached the limit of movement thereof, and second linkage means for moving said motor speed control element in said single direction in response to rocking movement of said foot pedal away from said neutral position in either direction.

* * * * *